(12) United States Patent
Barron

(10) Patent No.: US 7,536,079 B2
(45) Date of Patent: May 19, 2009

(54) METHOD FOR A TIME SHIFT DISPLAY OF A VIDEO SIGNAL AND APPARATUS THEREFORE

(75) Inventor: Steven Anthony Barron, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 922 days.

(21) Appl. No.: 10/925,233

(22) Filed: Aug. 24, 2004

(65) Prior Publication Data

US 2005/0047751 A1    Mar. 3, 2005

(30) Foreign Application Priority Data

Aug. 27, 2003    (EP) .................................. 03292114

(51) Int. Cl.
*H04N 7/00*    (2006.01)
*H04N 5/91*    (2006.01)
(52) U.S. Cl. .......................................... 386/68; 386/46
(58) Field of Classification Search .................. 386/68, 386/46, 83, 125, 1, 6
See application file for complete search history.

(56) References Cited

U.S. PATENT DOCUMENTS 5,999,694 A    12/1999    Yasuda et al.
6,172,712 B1    1/2001    Beard
2002/0178453 A1    11/2002    Jun et al.
2007/0127887 A1*    6/2007    Yap et al. ...................... 386/95

FOREIGN PATENT DOCUMENTS

WO    WO98/51076    11/1998

OTHER PUBLICATIONS

Search Report.

* cited by examiner

*Primary Examiner*—Robert Chevalier
(74) *Attorney, Agent, or Firm*—Robert D. Shedd; Joseph J. Opalach; Reitseng Lin

(57) ABSTRACT

The invention refers to a method for a time shift display of a video signal wherein upon a pause command a received video signal is recorded on a recording medium, and upon a resume command the recorded video signal is provided to a display device while the received video signal is continued to be recorded. It is desired to improve such method. According to the invention successive pause start indicators are stored upon further pause commands, and upon further successive resume commands recorded video signal starting from the latest or a successively previous pause start indicator is provided to a display device.

15 Claims, 3 Drawing Sheets

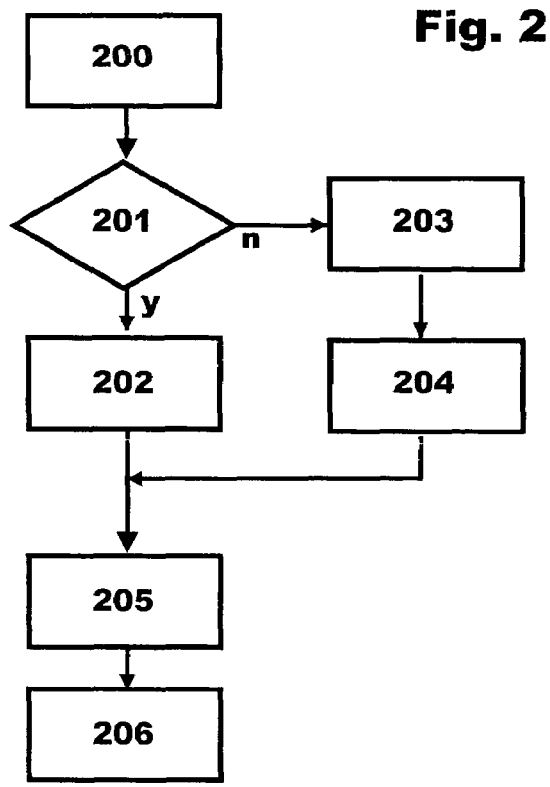
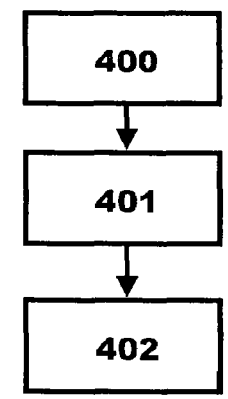
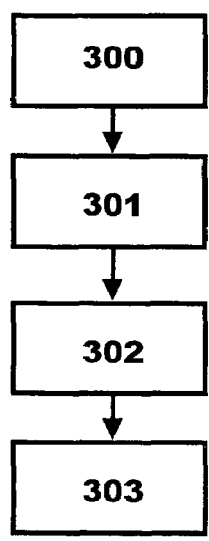
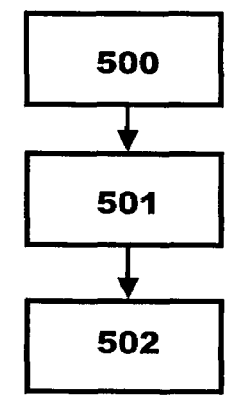
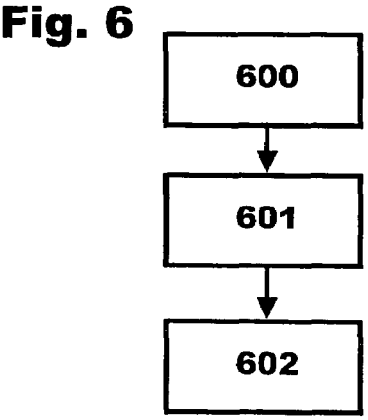

METHOD FOR A TIME SHIFT DISPLAY OF A VIDEO SIGNAL AND APPARATUS THEREFORE

This application claims the benefit, under 35 U.S.C. § 119 of European Patent Application 03292114.0, filed Aug. 27, 2003.

FIELD OF THE INVENTION

The invention refers to a method for a time shift display of a video signal wherein upon a pause command a received video signal is recorded on a recording medium and upon a resume command the recorded video signal is provided to a display device while the received video signal is continued to be recorded.

BACKGROUND OF THE INVENTION

U.S. Pat. No. 6,172,712 describes a television with hard-disc drive giving the possibility to pause display of a television programme and to resume display later on by storing the television programme received during the pause on a hard-disc and playing back from the hard-disc in a time shift manner.

SUMMARY OF THE INVENTION

It is an object of the invention to propose an improved apparatus with time shift video display capability.

According to the invention, a pause start indicator is stored when a pause command is received. This pause start indicator indicates the position where reading is to continue in order to resume display at the position where display was paused. When a further resume command is received, reading of recorded video signal starts at a position indicated by the pause start indicator. Preferably, successive pause start indicators are stored for successive pause commands and playback is resumed at the last stored pause start indicator or at previously stored pause start indicators if successive resume commands are given. This has the advantage that even in case of successive breaks of the time shift viewing the user always resumes playback at the position where the last pause command was given. Or, if desired, where one of the previous pause commands was given. There is no need for the user to search for the last or the previous pause start positions.

Advantageously, the latest signal provided to the display device is kept being provided to the display device upon a pause command. Advantage is that such still picture indicates to the user that the device is currently in the time shift recording mode.

According to another aspect of the invention a live command is provided, which makes the received video signal being directly provided to the display device while recording is being continued and a further pause start indicator is stored to allow resume of playback at the position where the live command was given. This solution provides for jumping to a currently received important program, e.g. the news, weather forecast, a lottery etc., that desirably is viewed in live mode, while keeping the possibility to quickly return to the paused time shift viewing.

Preferably the currently received signal is displayed as Picture in Picture on the display device in the pause mode or the time shift playback mode while the main picture is the pause mode picture, e.g. a still picture, or the time shift video signal, respectively. In this case the user will be indicated to a probably important live event to which he might desire to switch using the live command.

Advantageously only the latest pause start indicator is stored. This has the advantage that only a single pause start indicator needs to be stored. The signal recorded previous to this pause start indicator can be allowed to be overwritten thus increasing the available storage capacity. It is an easy to explain function to the user, thus being user friendly.

Advantageously a method for time shift display provides the capability to switch to live display, even during display of a time-shifted recording and to return to display of the time shifted recording at exactly the position where the switching to live display had occurred. This has the advantage that the user has the possibility to switch to live display e.g. a news show even when being in the time shift display mode without the necessity to, later on, search for the position where the live display was interrupted.

Preferably a method according to the invention uses indices to differentiate between different pause start indicators.

An inventive apparatus performs the method of the inventive method.

Preferably an apparatus according to the invention is provided with a video signal input, a recording and reading unit, a video signal output, a switching unit for selectively connecting video signal output, video signal input and recording and reading unit to one another, and a user interface with command inputs for pause, resume and live commands. In such an apparatus, a pause command initiates disconnecting video signal output from video signal input and connecting video signal input to the recording and reading unit, starting recording process and storing a pause start indicator pointing to the recording start position. A resume command provides for switching the video signal output to an output of the recording and reading unit, makes the recording and reading unit start reading at the start indication while continuing to record. A live command indicates the switching unit to connect the video signal output to the video signal input, the recording and reading unit to continue recording and to stop reading and provides for storing a pause start indicator pointing to the reading stop position.

Further details of the invention and advantages thereof are also indicated in the following description of exemplary embodiments using drawings.

DETAILED DESCRIPTION OF PREFERED EMBODIMENTS

Figure 1:
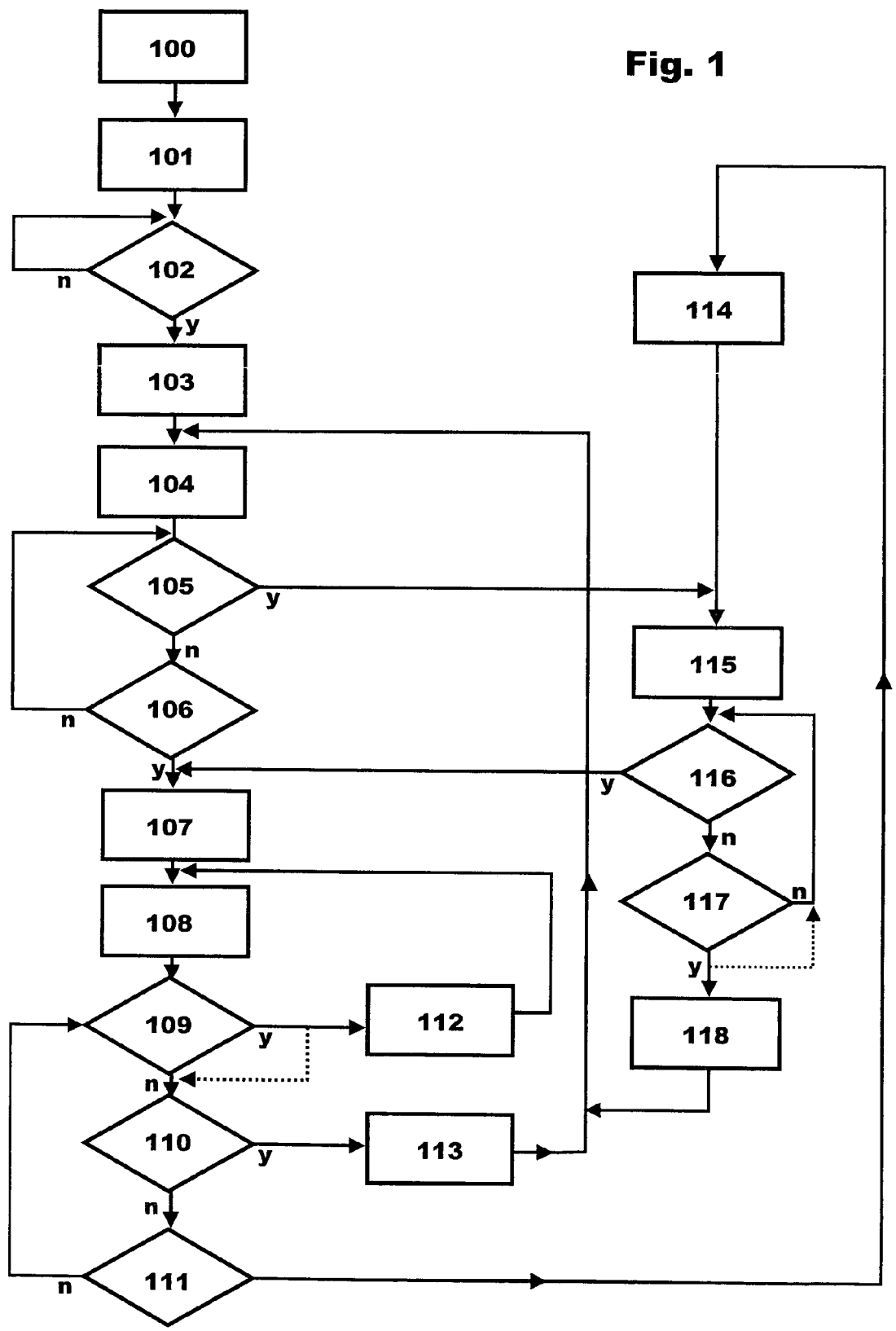
FIG. 1 Flow chart of inventive methods
FIG. 2 Flow chart for storing pause start indicators
FIG. 3 Flow chart for reading pause start indicators
FIG. 4 Flow chart for live display
FIG. 5 Flow chart for display of read signal
FIG. 6 Flow chart for display of still picture
FIG. 7 Apparatus according to the invention

FIG. 1 shows a flow chart of inventive methods, wherein some of the steps may be omitted without departing from the gist of the invention. The method starts with step 100. Step 101 provides for display of live signal wherein a received video signal VS is directly provided to a display device. In step 102 it is checked whether a pause command is given or not. If there is none, display of the live video signal is continued. If a pause command is received, in step 103 recording of the received video signal is started and a pause start indicator pointing to the position where the recording starts is stored. A still picture is provided in step 104 to the display device.

In step 105 it is checked whether a live command is received and in step 106 it is checked whether a resume command is received. Alternatively, one of steps 105 and 106 maybe omitted, however, both are described in this exemplary embodiment. If none of these commands is received, the still picture is continued to be displayed and steps 105 and/or 106 are repeated. In case a resume command is received in step 106, recording is continued in step 107 and it is started to read the recorded signal at the position pointed to by the pause start indicator. In step 108 the read signal is provided to the display device.

In step 109 it is checked for a resume command, in step 110 it is checked for a pause command and in step 111 it is checked for a live command. As with regard to steps 105 and 106, some of these might be omitted in alternative versions of the invention. This is indicated by a dotted line at the "yes" output of step 109, which leads to the same following step as the "no" output. At least one of steps 109, 110 and 111 is to be performed, however, they are all described here.

In case a resume command is detected in step 109, it is diverted to step 112. In step 112, recording of received video signal VS is continued and it is started to read out previously stored video signals starting at a position indicated by the previously stored pause start indicator PSI. After this it is continued with step 108.

If a pause command is detected in step 110 it is diverted to step 113. In step 113 recording of received video signal VS is continued and reading process of already stored video signal is stopped. Further, the position at which reading is stopped is stored as a pause start indicator PSI. After this it is returned to step 104.

If a live command is detected in step 111, it is diverted to step 114. In step 114 recording of received video signal VS is continued, reading process is stopped and the position at which the reading process is stopped is stored as pause start indicator PSI. After this it is diverted to step 115.

Step 115 follows step 114 or the detection of a live command in step 105. In step 115 the received video signal SV is directly provided to the display device for live display.

In step 116 it is checked whether a resume command is received. In case a resume command is received, it is continued with step 107. Or else it is checked for a pause command in step 117. Step 117 may also be omitted as indicated by dotted line. In case a pause command is detected in step 117, it is continued with step 118. In step 118 recording is continued and a further pause start indicator PSI(n) is stored. After this it is continued with step 104. In this case, when the next resume command is detected in step 106, reading in step 107 starts where the live display was paused as indicated by pause start indicator PSI(m) while a subsequent resume command detected in step 109 makes reading start at the previously recorded pause start indicator PSI(m−1), which is in the interrupted time shift playback. In this way, the user may jump backwards to different previously requested interruptions.

At step 102 it does not make sense to check for resume command or live command, as the device is in the live display mode and no recording has been made before. However, previously, the user might have made some time shift recordings, e.g. the day before or the week before, to which he might be interested to jump back. In this case, checking for resume command or live command between steps 102 and 103 might be useful with diverting to steps 112 or 114 in case of resume command or live command, respectively, are received. In this case, it would also be advisable to start recording already at or before step 101.

FIG. 2 shows a flow chart for starting pause start indicators PSI. After start in step 200 it is detected in step 201 whether the device is already recording. If this is the case, in step 202 the current reading position is stored as pause start indicator PSI(n). If the device is not yet in recording mode, an index n is set to n=1 in step 203. After that in step 204 the current recording position is stored as pause start indicator PSI(n). Following step 202 or 204 in step 205 the index n is increased to n=n+1 and a second index m is set to the value of the first index n that is to m=n. Storing of pause start indicators PSI(n) stops in step 206. In case the maximum number of storing positions is limited to a certain maximum value N in case of n>N respective measures to deal with this situation have to be taken. In case only a single pause start indicator PSI is used, steps 203 and 205 can be omitted.

FIG. 3 shows a flow chart for reading pause start indicators PSI(n). After start in step 300, in step 301 the index n is decreased by one to n=n−1 in case n assumed a value larger than one, that is n>1, else the index n is set to value one n=1. After this in step 302 the pause start indicator PSI(n) associated with index n is read. Reading pause start indicators PSI(n) ends in step 303. Here, too, in case only a single pause start indicator is used, step 301 is omitted. Also, in case a maximum number N for index n exists, respective measures have to be taken.

FIG. 4 shows a flow chart for live display. After start in step 400, reading is continued in step 401. Also, a small image of the read signal is added to the received signal to be provided to the display device in order to display a Picture in Picture view. The sub-routine ends in step 402. Of course, if no Picture in Picture feature shall be implemented, step 401 is reduced to just provide the display device with the received signal.

FIG. 5 shows a flow chart for display of a read signal with Picture in Picture functionality. After start in step 500, in step 501 a small image of the received live signal is added to the signal read from the storing device. The combined signal is provided to the display device for Picture in Picture display. This sub-routine ends in step 502.

FIG. 6 shows a flow chart for display of still picture with Picture in Picture function. After start in step 600, in step 601 a small image of the received signal is added to a still picture image. The combined signal is provided to the display device for Picture in Picture display. This sub-routine ends in step 602.

Figure 7:
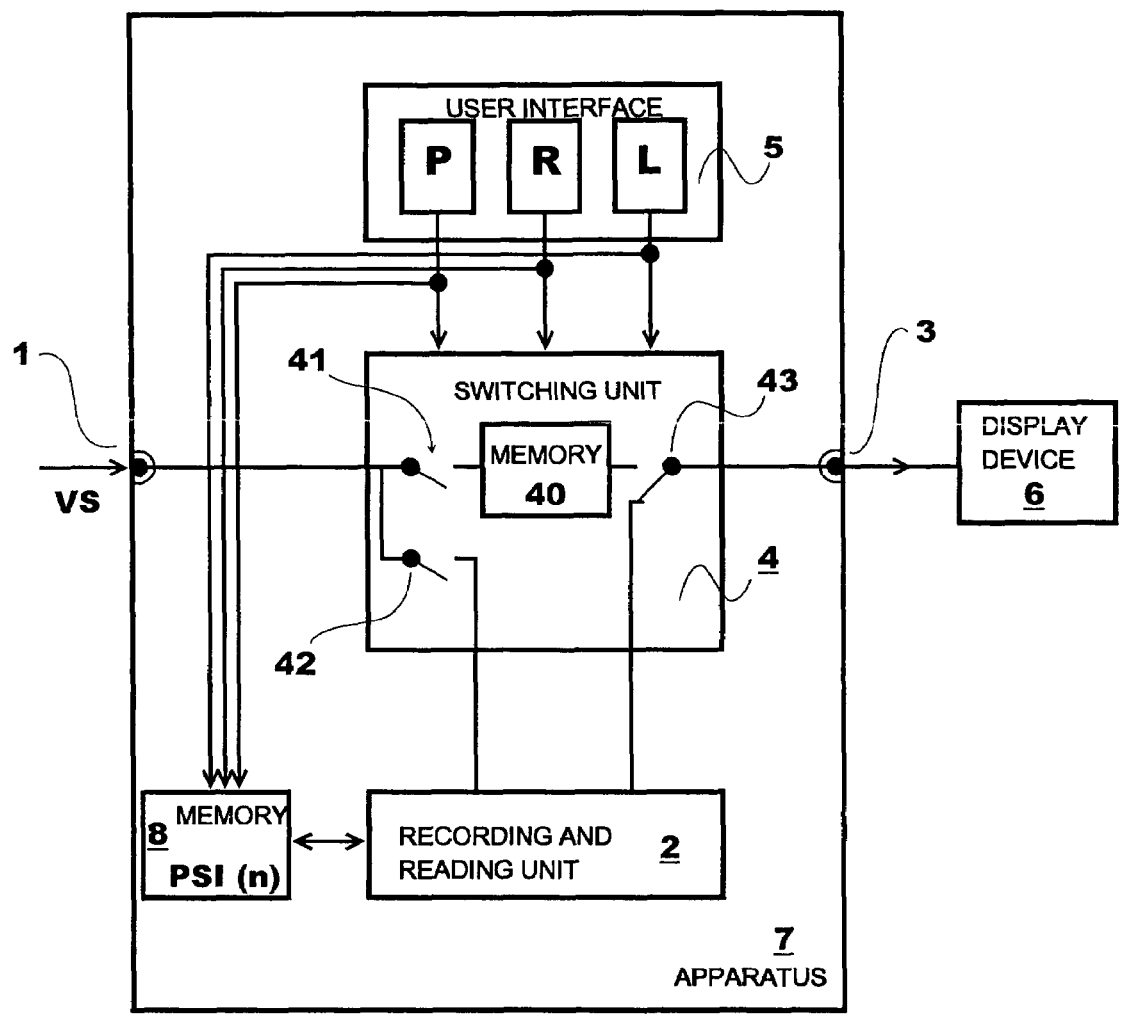

FIG. 7 shows an apparatus 7 according to the invention. A received video signal VS from a video source (not shown) is received at video signal input 1. The received video signal VS is provided to a recording and reading unit 2 and/or to a video signal output 3 via a switching unit 4. The apparatus 7 is provided with a user interface 5 having a command input for pause P, a command input for resume R and a command input for L. These command inputs P, R, L are indicated as buttons on user interface 1. User interface 1 may be arranged fixed to apparatus 7 or non-fixed to it as remote control. Depending on the commands received via user interface 5, the switching unit 4 connects the video signal output 3 with appropriate signals to be provided to a display device 6. The display device 6 may be an integral part of apparatus 6 or a separate display device, e.g. a TV set.

A memory 8 is connected to the user interface 5 output and to the recording an reading unit 2, in order to receive pause, resume, or live commands, and to receive from or provide to the recording and reading unit 2 respective pause start indicators PSI(n). The received indicators PSI(n) are stored, while indicators PSI(n) to be provided to the recording and reading unit (2) are read from the store of memory 8.

The switching unit 4 is provided with signal switching capability, which is indicated here by switches 41, 42, 43. A memory 40 is also shown as part of switching unit 4, however, this memory 40 might well be arranged separate from switching unit 4 or completely omitted. First switch 41 is provided for connecting or disconnecting an input of memory 40 to video signal input 1. Second switch 42 is provided for connecting or disconnecting an input of recording or reading unit 2 with video signal input 1. Third switch 43 is provided for connecting the video signal output 3 of the apparatus 7 with an output of memory 40 or an output of the recording and reading unit 2. When turning on apparatus 7, start configuration is such that switch 41 connects input of memory 40 with video signal input 1 and third switch 43 connects out video signal output 3 with output of memory 40. Second switch 42 may be in a disconnecting state as long as recording and reading unit 2 does not record, else it connects input of recording and reading unit 2 to the video signal input 1. However, switch 42 may also be in the connecting state independent whether unit 2 is in recording mode or not depending on requirements of recording and reading unit 2. The same switch configuration for switches 41 and 43 and the connected state of switch 42 is assumed after the command input for live L is actuated. In case the command for pause P is actuated, the input of memory 40 is disconnected from video signal input 1 and second switch 42 connects the input of recording and reading unit 2 to video signal input 1. In this case unit 2 records the received video signal VS and the last displayed video signal is kept in memory 40 and provided to video signal output 3. In case the command input for resume R is actuated, switch 41 disconnects input of memory 40 from video signal input 1, second switch 42 connects input of recording and reading unit 2 to video signal input 1 and switch 43 connects video signal output 3 with the output of recording and reading unit 2. In this case unit 2 performs recording of the received video signal VS as well as reading and outputting previously recorded video signals. Preferably, but not shown here, the output of unit 2 is also provided, in this situation, to an input of memory 40 in order to provide a still picture in case of sub-sequent pause command.

Recording and reading unit 2 is preferably a hard disc drive or a device for reading and recording on optical storage media as e.g. recordable optical discs In other words the invention solves the following problem: Currently, Personal Video Recorders, as hard disk drive devices, give the possibility to go into pause mode and to resume playback starting at the point where the pause mode was initiated. The invention provides a possibility to pause this time shift mode for going back to life mode and to resume the time shift mode. It is advantageous to be able to pause and to go back to the time shift mode, e.g. for watching a five minutes news broadcast live. Therefore, it is proposed according to the invention to provide a PVR with a "live" button in addition to "pause" and "go back" buttons. The "live" button always leads to live display but the resume point in the time shift recording, if started there, is maintained. When the "go back" button is hit, the time shift mode is started at the resume point. This gives a more user-friendly behaviour.

What is claimed is:

1. Method for a time shift display of a video signal wherein upon a pause command a received video signal is recorded on a recording medium, and upon a resume command the recorded video signal is provided to a display device while the received video signal is continued to be recorded wherein upon further pause commands successive pause start indicators are stored, and upon further successive resume commands recorded video signal starting from the latest or a successively previous pause start indicator is provided to a display device.

2. Method according to claim 1, wherein upon a pause command the latest signal provided to the display device is kept being provided to the display device.

3. Method according to claim 2, wherein upon a live command the currently received video signal is provided to the display device, and a further pause start indicator is stored.

4. Method according to claim 2 wherein the currently received video signal is displayed as Picture in Picture on the display device in the pause mode or the time shift playback mode.

5. Method according to claim 2, wherein only the latest pause start indicator is stored.

6. Method according to claim 1, wherein upon a live command the currently received video signal is provided to the display device and a further pause start indicator is stored.

7. Method according to claim 6 wherein the currently received video signal is displayed as Picture in Picture on the display device in the pause mode or the time shift playback mode.

8. Method according to claim 6, wherein only the latest pause start indicator is stored.

9. Method according to claim 1 wherein the currently received video signal is displayed as Picture in Picture on the display device in the pause mode or the time shift playback mode.

10. Method according to claim 9, wherein only the latest pause start indicator is stored.

11. Method according to claim 1, wherein only the latest pause start indicator is stored.

12. Method for a time shift display of a video signal according to claim 1 wherein upon a pause command a received video signal is recorded on a recording medium, and upon a resume command the recorded video signal is provided to a display device while the received video signal is continued to be recorded wherein upon a live command the currently received video signal is provided to the display device, and a pause start indicator is stored, and upon a further resume command recorded video signal starting from the pause start indicator is provided to the display device.

13. Method for a time shift display of a video signal wherein upon a pause command a received video signal is recorded on a recording medium, and upon a resume command the recorded video signal is provided to a display device while the received video signal is continued to be recorded wherein upon a live command the currently received video signal is provided to the display device, and a pause start indicator is stored, and upon a further resume command recorded video signal starting from the pause start indicator is provided to the display device.

14. Method according to claim 1 having the steps of
receiving a video signal;
providing said video signal to a display device;
in response to a pause command
recording said received video signal on a recording medium, and
providing a replacement signal to said display device;
in response to a resume command
continuing recording said received video signal,
reading said recorded signal, and
providing said read signal to said display device wherein
in response to a first pause command the recording position is stored as first pause start indicator, and an index n is set to value one and an index m is set to n;

in response to a further pause command the currently used reading position is stored as n-th starting indication, and an index n is increased and an index m is set to n;

in response to a resume command said index m is decreased except m already assumed value one, and reading is started at the m-th start indication.

15. Apparatus for receiving video signals corresponding to a television program from a video source for display on a display device the apparatus comprising a video signal input a recording and reading unit a video signal output a switching unit for selectively connecting video signal output to video signal input or recording and reading unit a user interface with command inputs for pause, resume and live commands whereby command input "pause" urges said switching unit to disconnect video signal output from video signal input and connects video signal input to recording and reading unit, said recording and reading unit to start recording, and a pause start indicator pointing to the recording start position to be stored;

command input "resume" urges said switching unit to connect video signal output to recording and reading unit, and recording and reading unit to continue recording and to start reading at the start indication;

command input "live" urges said switching unit to connect video signal output to video signal input, the recording and reading unit to continue recording and to stop reading, and a pause start indicator pointing to the reading stop position to be stored.

* * * * *